Oct. 2, 1928.  
C. E. DAVIS  
1,686,147  
SCRAPER LOADING DEVICE  
Original Filed Feb. 29, 1924 5 Sheets-Sheet 1
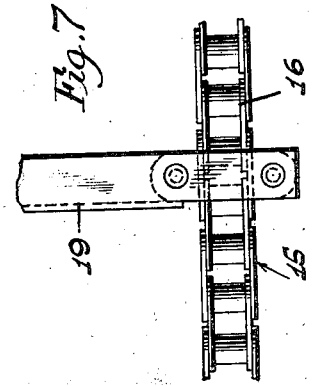
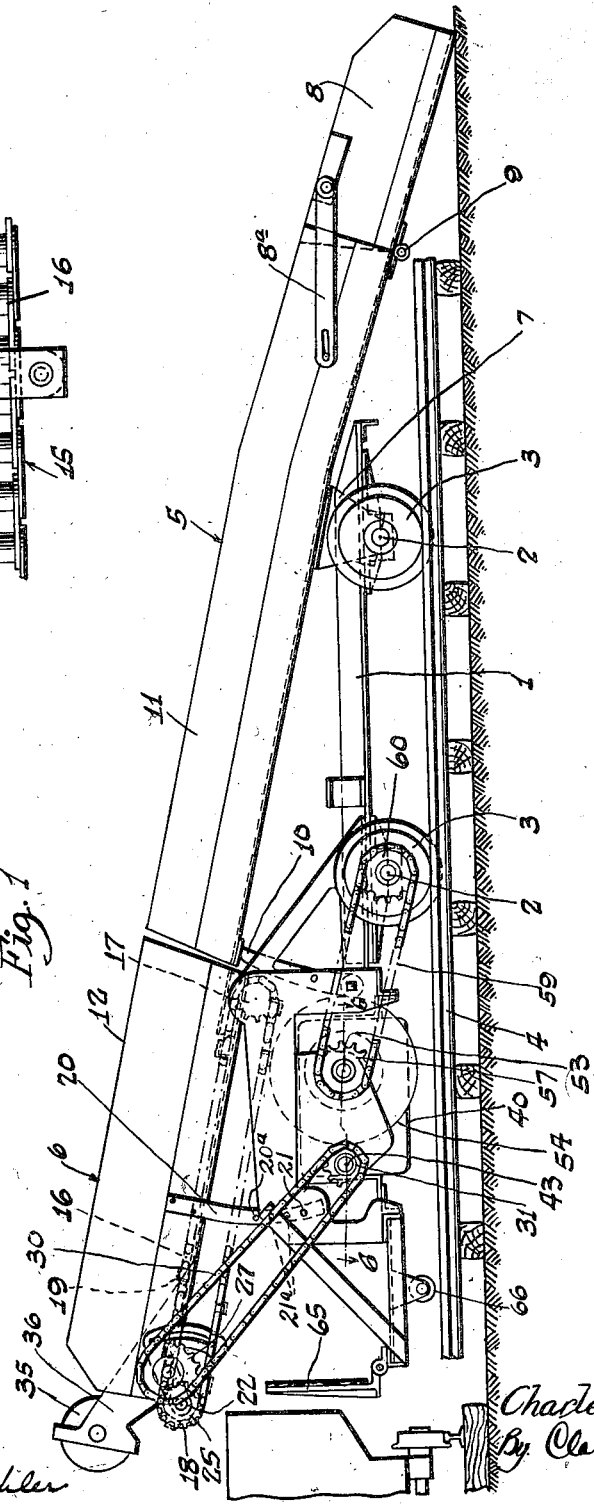
Witness  
Herbert A. Buehler
Inventor  
Charles E. Davis  
By Clarence F. Poole  
Atty.

Oct. 2, 1928.

C. E. DAVIS 1,686,147

SCRAPER LOADING DEVICE

Original Filed Feb. 29, 1924   5 Sheets-Sheet 2

Witness
Herbert A. Buehler

Inventor
Charles E. Davis
By Clarence J. Poole
Atty

Oct. 2, 1928.
C. E. DAVIS
1,686,147
SCRAPER LOADING DEVICE
Original Filed Feb. 29, 1924   5 Sheets-Sheet 3
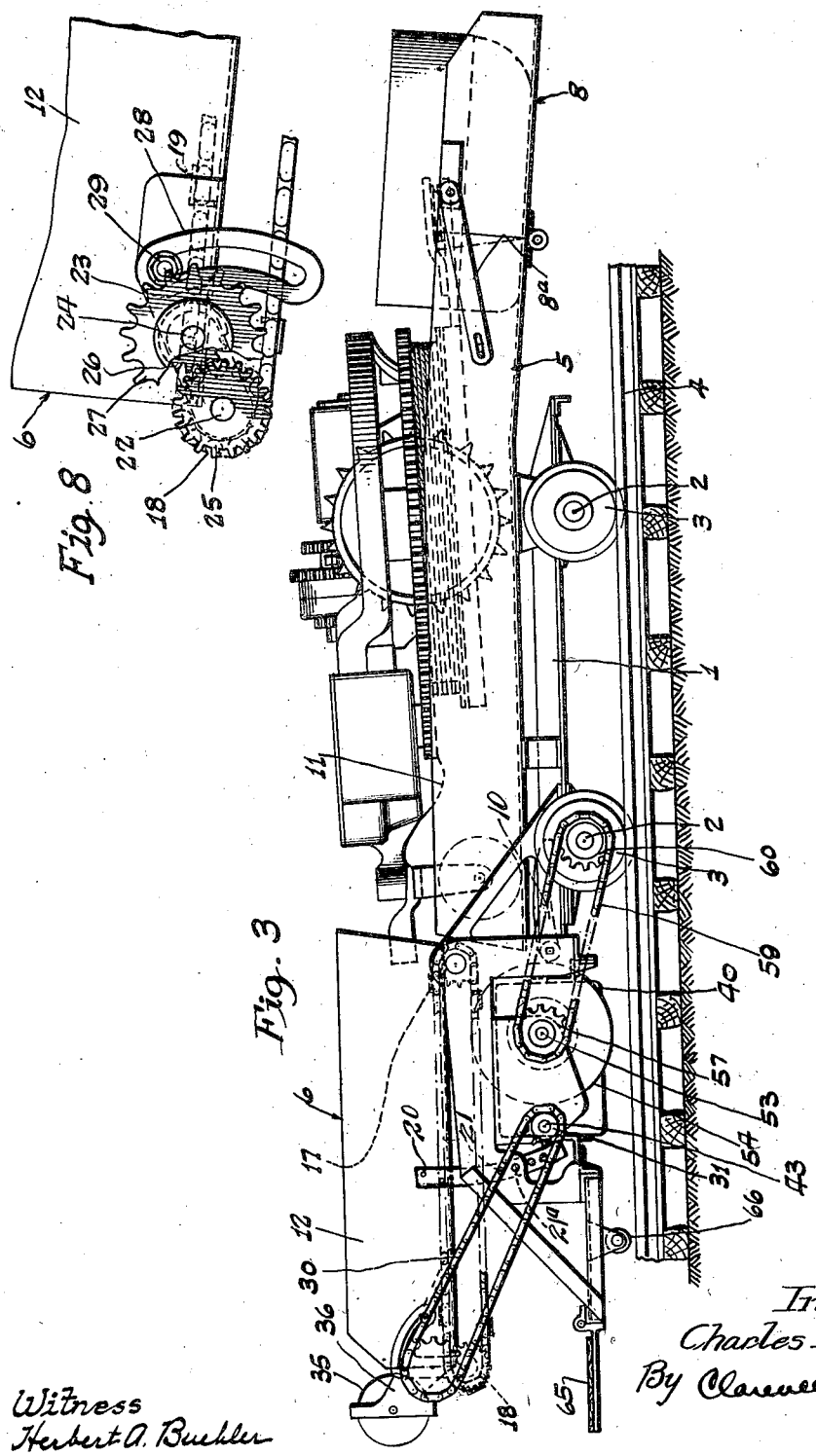

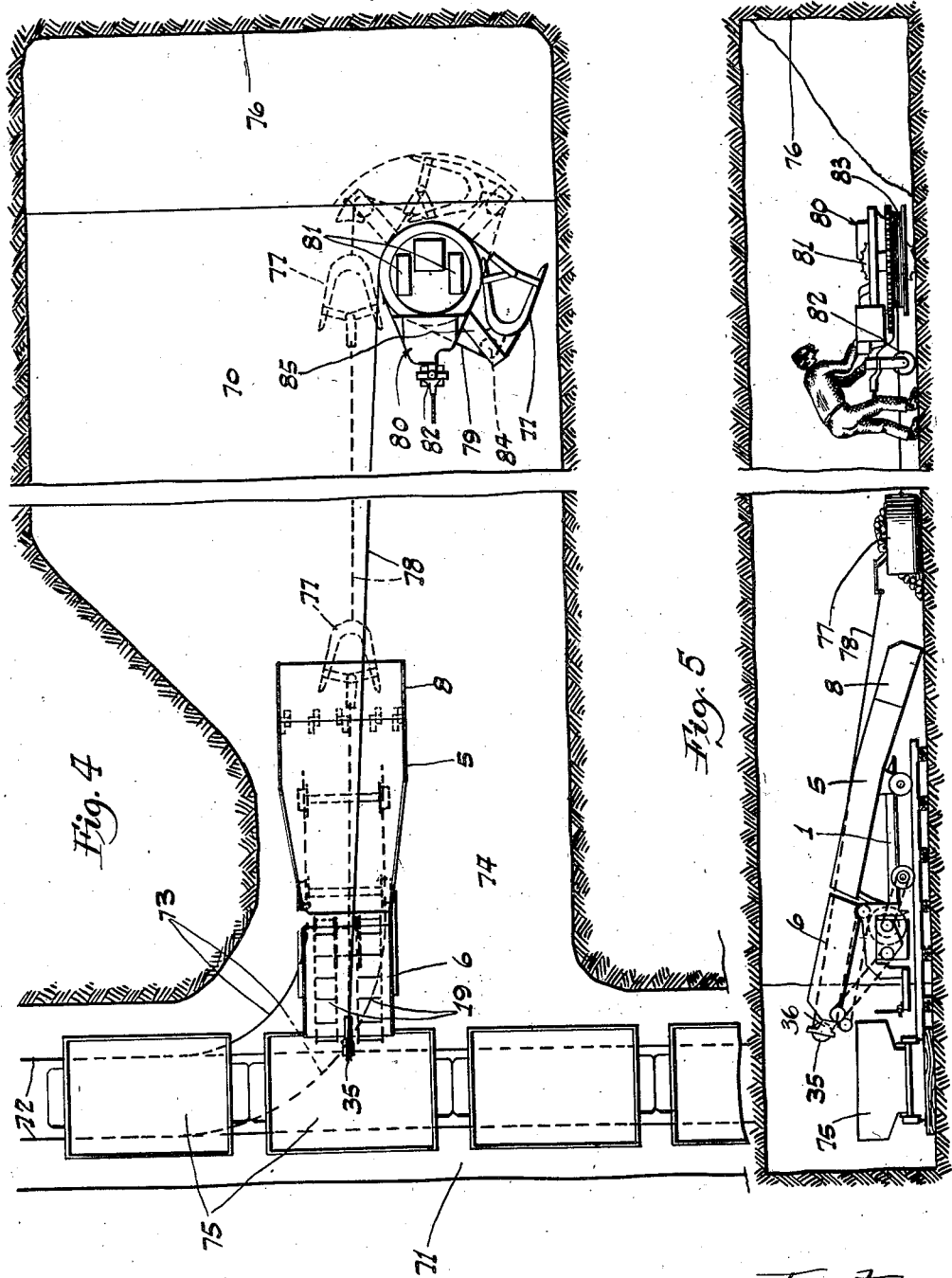

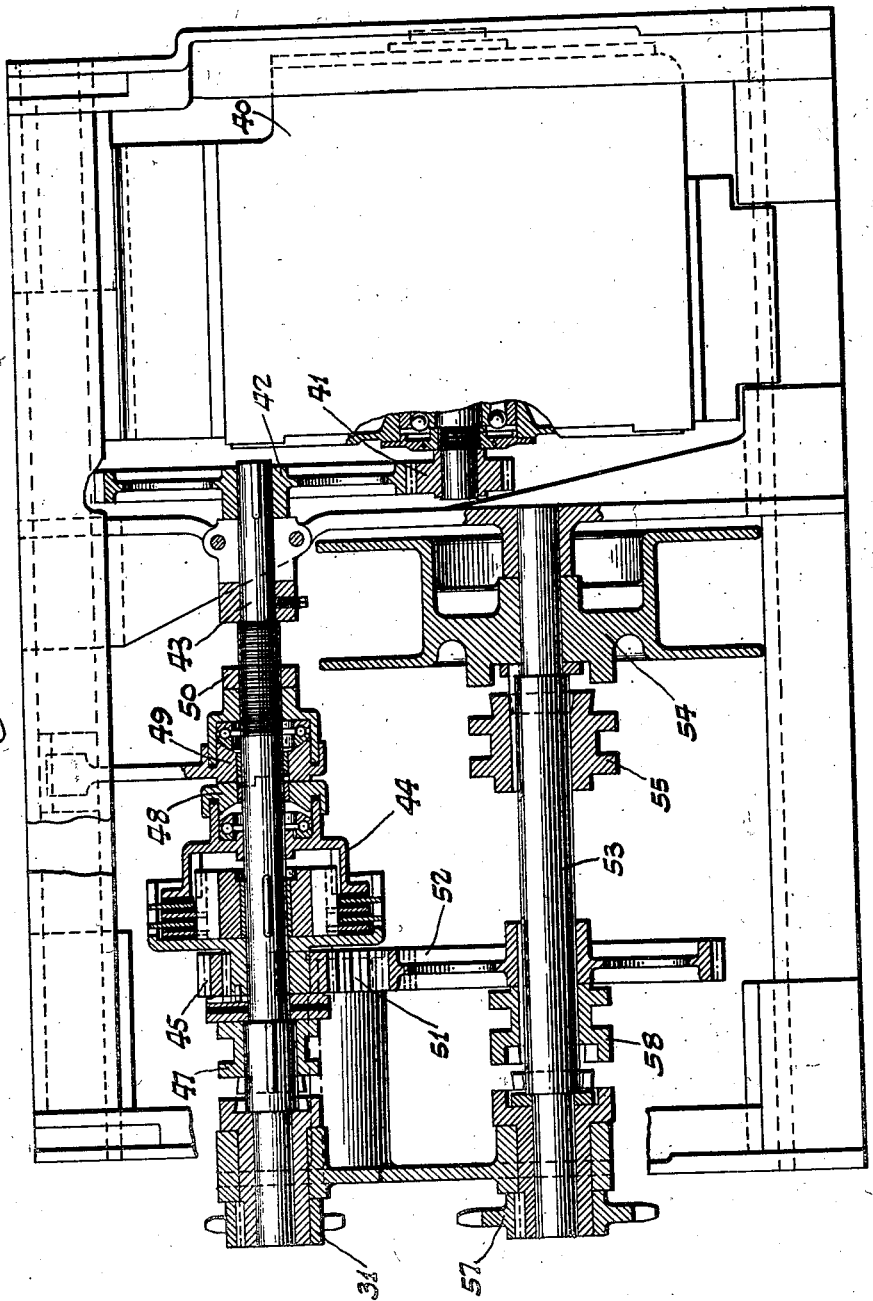

Patented Oct. 2, 1928.

1,686,147

UNITED STATES PATENT OFFICE.

CHARLES E. DAVIS, OF DAVENPORT, FLORIDA, ASSIGNOR TO GOODMAN MANUFACTURING COMPANY, OF CHICAGO, ILLINOIS, A CORPORATION OF ILLINOIS.

SCRAPER LOADING DEVICE.

Application filed February 29, 1924, Serial No. 695,895. Renewed June 29, 1927.

This invention relates to improvements in apparatus for scraper loading devices and more particularly to scraper loading apparatus for use in mines.

The principal object of the present invention is to provide a device to assist in the loading operation and also to transport the scraper and its guiding means from place to place in the mine. More specifically, the invention consists in the provision of a wheeled device having self-contained power devices therein and adapted to be used as a loading chute for elevating the scraper and transferring the material from the scraper to be discharged into a car at a point above the level of the mine floor, which device may also be used as a means for transporting the scraper and its guiding devices from one place to another in the mine.

The invention may be best understood by reference to the accompanying drawings illustrating one form in which it may be embodied.

In these drawings:

Figure 1 is a side view of the improved loading chute and transporting device showing it in position for loading adjacent a mine car.

Figure 3 is a side view of the device shown in Figure 1 but with a scraper and guiding device loaded thereon for transporting.

Figure 4 is a diagrammatic plan view showing a typical installation of the apparatus in a mine room.

Figure 5 is a side view of the apparatus shown in Figure 4.

Figure 6 is an enlarged sectional view of the power transmission mechanism taken on line 6—6 of Figure 1.

Figure 7 is a detail of the conveyor device.

Figure 8 is a detail of the conveyor adjusting mechanism.

Figure 2:
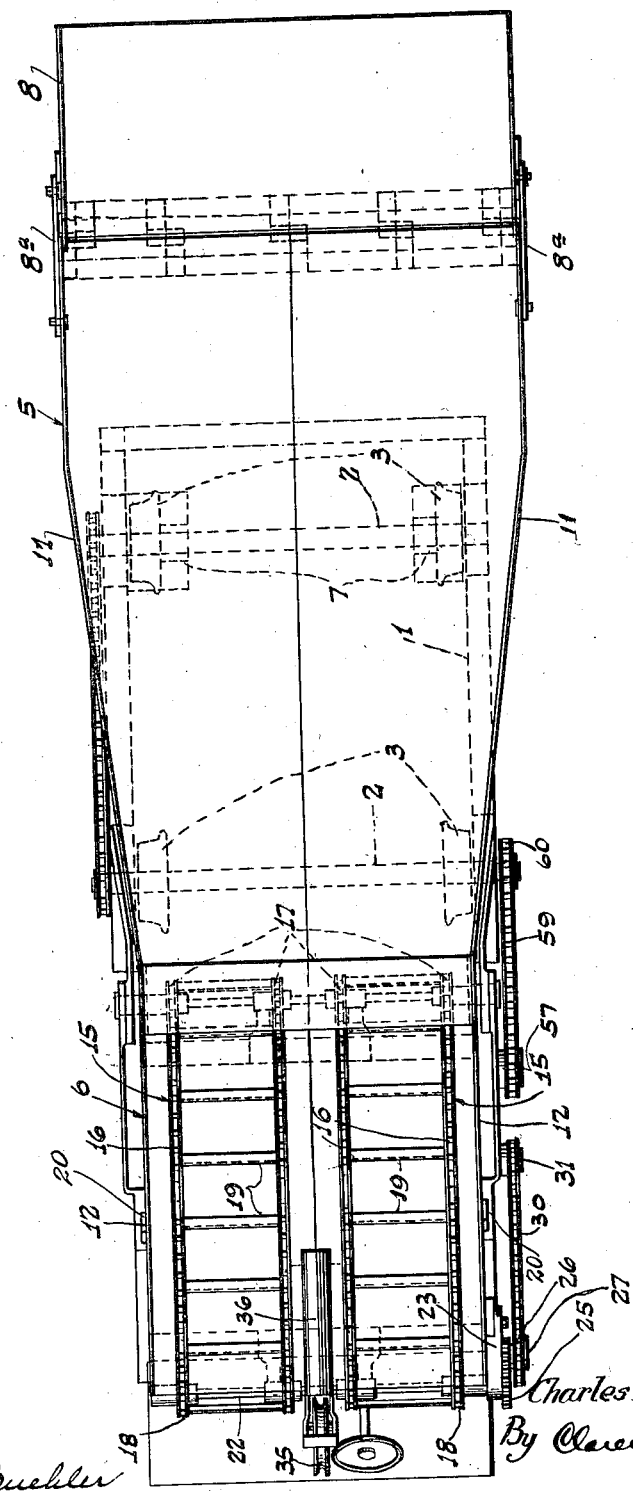
Figure 2 is a plan view of the chute shown in Figure 1.

The apparatus forming the subject matter of the present invention is particularly adapted for use in coal mines using the room and pillar system of mining, in which the coal is removed from rooms extended laterally from galleries or entries along which the transportation lines extend. In the adaptation of scraper loading devices to the room and pillar system of mining the coal is gathered from the working face in the room and transported by the scraper to a point adjacent the room entry where it is loaded upon the mine car by various means, such as a loading chute upon which the scraper is moved to an elevated position where its load may be discharged into the car standing on the track in the entry or gallery.

One of the difficulties heretofore encountered in the operation of scraper devices was that of providing a readily transportable apparatus which might be readily and quickly moved from room to room. This is especially so in the case where a loading chute of substantial elevation is necessary as well as the more or less heavy and substantial apparatus and mechanism required for moving and guiding the scraper in its loading operation.

In the present invention I provide a combined loading chute and transporting device preferably movable along the mine track, which device includes thereon suitable power devices for actuating the draft lines of the scraper. The device is also adapted to provide transportation thereon for the scraper and its guiding and controlling mechanism, being particularly adapted for use with a moving headframe such as is shown and described in my prior application bearing Serial Number 638,232, filed May 11, 1923, although its use is not limited to such a type of controlling apparatus. As herein illustrated, the moving headframe or scraper guiding mechanism is adapted to be moved under its own power to the working face remote from the loading chute, but when it is desired to transport the entire apparatus to another room the headframe and scraper may be loaded directly upon my improved form of chute which for purposes of transportation is readily convertible into a wheeled truck having a minimum overall height so as to be readily moved and handled under low roof conditions such as are often encountered in mines.

Referring now to details of the invention shown in the drawings, the combination loading chute and transporting device comprises a main frame 1 having a pair of axles 2, 2 with supporting wheels 3, 3 preferably flanged for movement along the mine track 4. Mounted over the frame 1 is a longitudinal runway consisting of lower and upper parts, 5 and 6. The lower part 5 is pivotally supported intermediate its ends on the forward portion of the frame, as for instance by the brackets 7, 7, pivotally mounted on the front axle 2. The part 5 when in inclined position shown in Figure 1 forms the lower portion of the inclined loading chute having its foremost end adapted to engage the mine floor beyond the ends of the track 4. As herein shown a lower end portion 8 is hinged at 9 to the main body portion of part 5 so as to be adjustable to variations in the mine floor, but limited in downward movement by arms 8a, 8a. The part 5 is supported in its inclined position by suitable means such as an arm 10 movable into supporting position underneath the upper end of said part, as shown in Figure 1. When used as a transportation device, part 5 is movable into substantially horizontal position, as shown in Figure 3, by swinging the supporting arm 10 downwardly into the position shown in dotted lines in the latter figure.

As shown herein, part 5 of the loading chute is relatively wide at its front end and converges rearwardly toward the upper portion 6 of the chute so that the scraper will be guided in its upward movement between the upright walls 11, 11 of the lower part 5 and the upright walls 12, 12 of the upper part 6.

The upper runway 6 constitutes a receiving and discharging receptacle for the loose material deposited therein by the scraper in its reciprocable movement. A conveyor device is provided on its bottom, as for instance comprising a pair of conveyor flights 15, 15 extending longitudinally of said member and adapted to carry the material deposited thereon toward the rear for discharge into a mine car, as shown in Figure 1. The conveyor devices may be of any suitable construction, as herein shown comprising a pair of conveyor chains 16, 16 movable over front and rear sprockets 17 and 18 and having conveyor bars 19, 19 spaced at intervals between the chains 16, 16.

The upper part 6 is pivotally connected to the main frame 1 on an axis concentric with the front conveyor sprocket 17 so that the said part may be adjusted in inclined positions, as shown in Figure 1, or may be lowered into substantially horizontal position, as shown in Figure 4. The position of the part 6 is controlled by a pair of upright supports, 20, 20, providing an adjustable support connecting said part with the main frame. Said part may thus be adjusted to various heights of the cars into which the material is loaded and may also be lowered to a minimum overall height when the apparatus is being transported from place to place. Any suitable means may be provided to hold the part 6 in its various positions of adjustment. In the illustration herein shown (Figure 1) a plurality of holes 20a are provided in the member 20. A pin 21 is provided to pass through any one of the holes 20a in the member 20 and a corresponding hole in the frame 1 to support the members 20 on the frame 1. It may thus be seen that this forms a simple adjustable support for the part 6 so that said part may be adjusted for various heights of mine cars encountered. Suitable driving connections are provided for the conveyor. As shown herein a compensating device is provided at the rear end of the conveyor so that the latter may be driven in all permissible positions of the pivotally movable part 6. This compensating device is shown in detail in Figure 8 in which it will be observed that the chain sprockets 18, 18 are mounted on shaft 22 extending across the rear end of the movable part 6. A rocking arm 23 is pivotally supported on one end of the shaft 22. A gear wheel 25 is keyed to the shaft 22 and is meshed with a gear 26 mounted on a stub shaft 24 carried by the rocking arm 23. A sprocket 27 is keyed to the gear 26. The movement of the rocking arm 23 is adjustable about the axis of the shaft 22 by means of a slotted member 28 connected at the free end of the rocking arm 23 and adjustable in position by means of a bolt 29 secured to the side plate 12 of the chute. This arrangement affords a compensating adjustment for a driving chain 30 trained over the sprocket 27 and a driving sprocket 31 connected to a motor, as will hereinafter appear. By adjusting the position of the rocking arm 23 the drive chain 30 may be maintained in the proper tension in all permissible positions of the pivoted chute 6, as may be seen by comparison with Figures 1 and 4.

A rope guide or sheave 35 is mounted on a bracket at the rear or upper end of the chute part 6 and centrally thereof. This sheave preferably extends beyond the end of the chute and has the draft lines of the scraper trained thereabout. As shown herein the bracket 36 is secured to the chute intermediate the parallel conveyors.

The actuating devices on my improved apparatus will now be described. A motor 40 is mounted on the main frame 1, preferably beneath the rear end of the chute. The armature pinion 41 thereof is meshed with a gear 42 keyed on a transverse shaft 43. This shaft extends to the opposite side of the frame and has mounted thereon a main driving clutch 44 forming an operative connection to a spur gear 45. The conveyor sprocket 31 is also mounted on this shaft and is operatively connected thereto by means of a sliding clutch member 47.

The main driving clutch 44 may be of any suitable construction. As shown herein it comprises a multiple disc friction clutch in which the friction is controlled by a rotatable cam member 48 engaging a cam seat 49 adjustable longitudinally of the shaft by means of a threaded nut 50. The gear pinion 45 is operatively connected to a gear 52 through the idler gear 51. Gear 52 is keyed on shaft 53 having a winding drum 54 loosely mounted thereon and operatively connected to the shaft by means of a sliding clutch member 55. Means are also provided for propelling the frame on the mine track including a chain sprocket 57 loosely mounted at the outer end of shaft 53 and connected thereto by a sliding clutch member 58. A drive chain is trained over the sprocket 57 and a similar sprocket 60 fixed on the rear axle 2 of the main frame.

A pivoted extension 65 is provided at the rear end of the frame and is arranged so that it forms a platform for the operator when transporting the device from place to place. This member 65 is hinged so that it may be raised out of the way, as shown in Figure 1. A longitudinal roller 66 is mounted beneath the rear end of the main frame 1. This roller is adjustable vertically, being raised from the track during movement of the truck, but lowered during the loading operation, to provide a stabilizing support for the overhanging rear portion of the main frame.

The operation of the device as applied to a typical mine employing the room and pillar system of mining is shown in Figures 4 and 5. A mine room 70 is formed at an angle from the entry or gallery 71 along which the car tracks 72, 72 extend. A stub switch track 73 extends into the room entry or room neck 74 a sufficient distance to support the loading devices in a lateral direction with the rear end in position to overhang the mine cars 75, 75.

The material is dislodged by the usual mining methods at the far end or working face of the room as indicated at 76. The apparatus for gathering and transporting this loose material from the working face to the entry herein consists of a scraper 77 preferably having an open bottom as shown, and moved reciprocably by a head rope 78 and a tail rope 79. The guiding apparatus includes a head frame 80 having traction devices 81, 81 and a steering wheel 82 whereby said frame may be moved universally over the mine floor and provide lateral support for the scraper at any desired point as it is moved horizontally thereabout and forced into the pile of loose material to gather its load. In the form shown the tail rope 79 is wound on a drum 83 carried by the head frame and is trained about a sheave 84 on a rocking arm 85 against which the rear end of the scraper is adapted to have engagement while moving about the head frame. Details of the construction of the head frame are disclosed in my copending application bearing Serial Number 638,232, filed May 11, 1923, and need not be further described herein as it forms no essential part of the present invention. The head rope 78 is trained over a sheave 35 at the upper end of the runway on the loading chute and from thence extends to the winding drum 54 (see Figure 6) associated with the power devices, as hereinabove described. The arrangement is such that when in the loading position as shown in Figures 4 and 5 the scraper is drawn forwardly with its load onto the inclined chute formed of the lower portion 5 and the upper portion 6 arranged in alignment with each other, as shown. When the scraper reaches the upper portion 6 its forward movement is discontinued by throwing out the clutch 55 of the actuating devices, the material in the scraper then being in position over the conveyor devices in the upper member 6. These conveyor devices are usually operated continuously so as to pick up the loose material deposited by the scraper and discharge it over the upper end of the chute portion 6 into the cars 75, 75, although the conveyors may be stopped whenever desired, as for instance when changing cars, by throwing out the clutch 47 from the sprocket 31.

After each room is loaded out the scraper and its guiding mechanism are drawn upon the lower pivotal portion 5 of the chute, said pivotal portion then being moved into a horizontal position, as shown in Figure 3. The upper portion 6 of the chute may also be lowered into substantially horizontal position as shown and the entire mechanism then requires minimum head room and may be readily transported over the tracks to the next room entrance where the loading operation is to be repeated. The truck is propelled under its own power by engaging clutch member 58 with drive sprocket 57.

Although my invention is especially adapted for use in connection with a movable head frame such as is herein illustrated, it will be understood that in its broadest conception it may also be used in connection with other scraper devices and apparatus, in all instances providing a convenient transportable loading chute as well as a most convenient means for transporting the scraper apparatus. Heretofore, such apparatus has been moved from place to place either by loading it on an ordinary truck or by moving the same bodily. In most instances the apparatus must travel through the entries in which the tracks are laid, making it impractical to use any other means of transportation except a wheeled truck.

Although I have shown and described one form in which my invention may be embodied it will be understood that the construction and arrangement of the various parts may be altered without departing from its spirit and scope. I do not therefore, wish to be understood as limiting myself to the specific embodiment illustrated and described, excepting as it may be limited in the appended claims.

I claim as my invention:

1. A combined loading chute and transportation device comprising a wheeled truck having a main frame and an inclined chute on said frame comprising upper and lower portions normally in alignment with each other, the lower portion being mounted for rocking movement intermediate its ends on said main frame and adjustable into substantially horizontal position with its upper end in supporting engagement with said frame.

2. A combined loading chute and transporting device comprising a wheeled truck having a main frame and an inclined chute on said frame comprising upper and lower portions normally in alignment with each other, the lower portion having its extreme end adapted to engage the ground, and means affording rocking movement of said lower portion bodily about a transverse axis intermediate its ends.

3. A combined loading chute and transporting device comprising a wheeled truck adapted for movement on mine tracks having a main frame and an inclined chute on said frame comprising upper and lower portions normally in alignment with each other, the lower portion having its extreme end adapted to engage the ground below the level of the track, and means affording rocking movement of said lower portion bodily about a transverse axis intermediate its ends.

4. A device for handling loose material comprising a portable power device and an incline mounted thereon comprising two portions normally in alignment with each other, means permitting rocking movement of the lower portion about a transverse axis, intermediate its ends conveyor mechanism along the bottom of the upper portion adapted to discharge material rearwardly therefrom, and power connections between said power device and said conveyor mechanism.

5. A device for handling loose material comprising a scraper having head and tail lines connecting therewith for reciprocably moving the same, a wheeled truck having an incline mounted thereon, said incline comprising upper and lower portions, power devices for said scraper located beneath the upper member, and means permitting rocking movement of said lower member on a transverse axis with its rear extremity movable forwardly of the front boundary of said power devices.

6. A device for handling loose material comprising a scraper having head and tail lines connected therewith for reciprocably moving the same, a wheeled truck having an incline mounted thereon, said incline comprising upper and lower portions, means permitting rocking movement of the lower portion about a transverse axis intermediate its ends, power devices for said scraper located beneath the upper member, conveyor mechanism along the bottom of said upper member to discharge materials from the upper end thereof, power devices for said scraper, and operating means between said conveyor device and said power devices.

7. A device for handling loose material comprising a scraper having a head rope and tail rope for reciprocable movement thereof, a truck having an incline mounted thereon, a pair of spaced conveyor devices arranged longitudinally adjacent the upper end of said incline, guide means at the upper margin of said incline and between said conveyor devices adapted for engagement with the head rope, and power devices beneath said incline including a winding drum for said head rope.

8. A device for handling loose material comprising a scraper having a head line and a tail line adapted for reciprocably moving the same, direction changing means for said scraper, and a combined loading chute and transporting device adapted in operation to be positioned remote from said direction changing means and comprising a wheeled truck having an inclined portion thereon adapted during the loading operation to provide an inclined chute cooperating with the scraper to elevate the same and discharge the material therefrom beyond said wheeled truck, and having a lower portion thereof movable on a transverse axis and adapted to receive said scraper and direction changing devices in supported relation thereon.

9. A combined loading chute and transportation device comprising a wheeled truck having a main frame and an inclined chute on said frame comprising upper and lower portions normally in alignment with each other, both of said portions being mounted for rocking movement on said main frame and adjustable into position substantially horizontal with respect thereto.

10. A combined loading chute and transporting device comprising a wheeled truck having a main frame and an inclined chute on said frame comprising upper and lower portions normally in alignment with each other, the lower portion having its extreme end adapted to engage the ground, means according rocking movement of said lower portion bodily about a transverse axis intermediate its ends, and means affording rocking movement of said rear portion about a transverse axis adjacent its lower end.

11. A device for handling loose material comprising a portable power device and an incline mounted thereon comprising two portions normally in alignment with each other, means permitting rocking movement of the lower portion about a transverse axis, means permitting rocking movement of said upper portion about a transverse axis adjacent its lower end, conveyor mechanism along the bottom of the upper portion adapted to discharge material rearwardly therefrom, and power connections between said power device and said conveyor mechanism.

12. A device for handling loose material comprising a portable power device and an incline mounted thereon comprising two portions normally in alignment with each other, means permitting rocking movement of the lower portion about a transverse axis, means permitting rocking movement of said upper portion about a transverse axis adjacent its lower end, conveyor mechanism along the bottom of the upper portion adapted to discharge material rearwardly therefrom, power connections between said power device and said conveyor mechanism at the upper end thereof, and compensating means permitting driving engagement in all permissible positions of said upper portion.

13. A device for handling loose material comprising a scraper having head and tail lines connected therewith for reciprocably moving the same, a wheeled truck having an incline mounted thereon, said incline comprising rear and lower portions, power devices for said scraper located beneath the upper member, means permitting rocking movement of said lower member on a transverse axis with its rear extremity movable forwardly of the front boundary of said power devices, and means permitting rocking movement of said upper member on a transverse axis above said power devices.

Signed at Chicago, in the county of Cook and State of Illinois, this 18th day of February, A. D. 1924.

CHARLES E. DAVIS.